(12) United States Patent
Salter et al.

(10) Patent No.: US 12,233,955 B2
(45) Date of Patent: Feb. 25, 2025

(54) SYSTEMS AND METHODS FOR ACCESSING MOTOR VEHICLE CARGO SPACES

(71) Applicant: FORD GLOBAL TECHNOLOGIES, LLC, Dearborn, MI (US)

(72) Inventors: Stuart C. Salter, White Lake, MI (US); David Brian Glickman, Southfield, MI (US); Michael John Harmon, Northville, MI (US); Dennis Yee, Milford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 262 days.

(21) Appl. No.: 17/739,483

(22) Filed: May 9, 2022

(65) Prior Publication Data

US 2023/0356787 A1    Nov. 9, 2023

(51) Int. Cl.
*B60R 3/02*    (2006.01)
*B60Q 1/24*    (2006.01)
*B60Q 1/30*    (2006.01)
*B62D 33/027*    (2006.01)
*B62D 33/03*    (2006.01)

(52) U.S. Cl.
CPC ......... *B62D 33/0273* (2013.01); *B60Q 1/307* (2013.01); *B60R 3/02* (2013.01); *B62D 33/0276* (2013.01); *B62D 33/03* (2013.01); *B60Q 1/247* (2022.05)

(58) Field of Classification Search
CPC .......... B60R 3/02; B60Q 1/307; B60Q 1/247; B62D 33/02; B62D 33/023; B62D 33/0273; B62D 33/03; B62D 33/0276
See application file for complete search history.

(56) References Cited

U.S. PATENT DOCUMENTS

| | | | | |
|---|---|---|---|---|
| 5,549,312 A | * | 8/1996 | Garvert | B60R 3/02 280/166 |
| 6,460,915 B1 | * | 10/2002 | Bedi | B60J 5/0498 296/183.1 |
| 7,118,150 B2 | * | 10/2006 | Bruford | B60R 3/02 296/37.1 |
| 7,686,365 B2 | | 3/2010 | Thelen et al. | |
| 8,237,557 B1 | * | 8/2012 | Hertz | B60Q 7/02 340/468 |
| 9,944,231 B2 | * | 4/2018 | Leitner | B60R 3/02 |
| 10,081,302 B1 | * | 9/2018 | Frederick | B60R 3/002 |
| 10,974,653 B2 | | 4/2021 | Scaringe et al. | |
| 11,535,161 B1 | * | 12/2022 | Walker | B60R 3/02 |
| 2006/0119134 A1 | * | 6/2006 | Dean | B62D 33/0273 296/182.1 |
| 2006/0124375 A1 | * | 6/2006 | Lahr | B60R 3/02 180/271 |
| 2016/0339844 A1 | * | 11/2016 | Pribisic | B60R 3/02 |
| 2017/0190282 A1 | * | 7/2017 | Salter | H05B 45/10 |
| 2017/0246992 A1 | * | 8/2017 | Giesmann | E06C 5/24 |
| 2017/0298675 A1 | * | 10/2017 | Dimig | B60R 3/02 |

(Continued)

*Primary Examiner* — Gregory A Blankenship
(74) *Attorney, Agent, or Firm* — Vichit Chea; Carlson, Gaskey & Olds, P.C.

(57) ABSTRACT

Various vehicle systems are proposed for facilitating access to and utilization of motor vehicle cargo spaces. The vehicle systems may include deployable stairgate systems, deployable step systems, cargo bed swing door systems, etc. The vehicle systems allow the cargo spaces to be accessed from a variety of positions relative to the cargo space.

19 Claims, 7 Drawing Sheets

(56) References Cited

U.S. PATENT DOCUMENTS

| | | | | |
|---|---|---|---|---|
| 2017/0313256 A1* | 11/2017 | Martin | ................ | B60R 3/00 |
| 2019/0009711 A1* | 1/2019 | Salter | ................ | F21S 43/33 |
| 2021/0039722 A1 | 2/2021 | Williamson et al. | | |
| 2021/0078591 A1* | 3/2021 | Du | ................ | G01G 19/08 |
| 2021/0086702 A1* | 3/2021 | Christensen | ............ | B60R 3/02 |
| 2021/0268965 A1* | 9/2021 | Stojkovic | ............ | B60R 9/02 |
| 2022/0355737 A1* | 11/2022 | Nania | ............ | B62D 33/0273 |
| 2023/0356787 A1* | 11/2023 | Salter | ................ | B60Q 3/30 |
| 2024/0123930 A1* | 4/2024 | Worthington | ............ | B60N 2/01 |

\* cited by examiner

SYSTEMS AND METHODS FOR ACCESSING MOTOR VEHICLE CARGO SPACES

TECHNICAL FIELD

This disclosure relates generally to motor vehicles, and more particularly to systems and methods for accessing and utilizing motor vehicle cargo spaces.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed.

SUMMARY

A vehicle system according to an exemplary aspect of the present disclosure includes, among other things, a cargo bed including a tailgate structure, a deployable ladder movable between a stowed position in which the deployable ladder is housed within an internal cavity of the tailgate structure and a deployed position in which the deployable ladder is extendable outside of the internal cavity, and a split optic lighting module mounted within the internal cavity and configured to simultaneously produce a first light beam for illuminating portions of the deployable ladder and a second light beam for illuminating portions of the cargo bed when the deployable ladder is in the deployed position.

In a further non-limiting embodiment of the forgoing vehicle system, the first light beam illuminates at least one step of the deployable ladder, and the second light beam illuminates a floor or a side wall of the cargo bed.

In a further non-limiting embodiment of either of the foregoing vehicle systems, the deployable ladder includes a main stair section and an adjustable stair section that is slidable relative to the main stair section.

In a further non-limiting embodiment of any of the foregoing vehicle systems, the adjustable stair section includes a lower step and at least one additional step.

In a further non-limiting embodiment of any of the foregoing vehicle systems, the adjustable stair section includes a first pair of outer frame sections that are slidable within a second pair of outer frame sections of the main stair section.

A vehicle system according to another exemplary aspect of the present disclosure includes, among other things, a cargo bed including a first side wall, a second side wall, a floor, a front wall, and a tailgate structure, and a deployable step system mounted to at least one of the first side wall or the second side wall and being movable between a stowed position and a first deployed position. In the stowed position, a drop step of the deployable step system establishes a portion of the first side wall or the second side wall. In the first deployed position, the drop step provides a first box-side step surface for accessing the cargo bed.

In a further non-limiting embodiment of the foregoing vehicle system, the deployable step system includes a deployable step that is rotatably connected to the drop step.

In a further non-limiting embodiment of either of the foregoing vehicle systems, in a second deployed position of the deployable step system, the deployable step provides a second box-side step surface for accessing the cargo bed.

In a further non-limiting embodiment of any of the foregoing vehicle systems, the second box-side step surface is positioned at a lower height than the first box-side step surface compared to a ground surface.

In a further non-limiting embodiment of any of the foregoing vehicle systems, the deployable step system includes a light pipe arranged for illuminating portions of the drop step.

In a further non-limiting embodiment of any of the foregoing vehicle systems, the light pipe is connected to a tail lamp assembly.

In a further non-limiting embodiment of any of the foregoing vehicle systems, the system includes a sensor system and a control module operably connected to the sensor system. The control module is programmed to command an alarm when the sensor system detects that the deployable step system is in the first deployed position and when a vehicle comprising the vehicle system is moved to a drive gear.

In a further non-limiting embodiment of any of the foregoing vehicle systems, a bottom surface of the drop step establishes part of an outer panel of the first side wall or the second side wall when the deployable step system is in the stowed position.

A vehicle system according to another exemplary aspect of the present disclosure includes, among other things, a cargo bed including a first side wall, a second side wall, a floor, a front wall, and a tailgate structure, and a cargo bed swing door system including a swing door mounted to either the first side wall or the second side wall. The swing door is movable between a closed position and an open position. The cargo bed is accessible through a cargo bed side access opening when the swing door is moved to the open position.

In a further non-limiting embodiment of the foregoing vehicle system, the swing door is pivotably mounted to the first side wall or the second wall by a hinge pillar.

In a further non-limiting embodiment of either of the foregoing vehicle systems, the hinge pillar is mounted to both an outer panel and an inner panel of the first side wall or the second side wall.

In a further non-limiting embodiment of any of the foregoing vehicle systems, the cargo bed side access opening is a pass-through opening formed through the inner panel.

In a further non-limiting embodiment of any of the foregoing vehicle systems, the hinge pillar is mounted above a vehicle wheel well.

In a further non-limiting embodiment of any of the foregoing vehicle systems, the cargo bed swing door system includes a light pipe arranged for illuminating portions of the swing door when the swing door is moved to the open position.

In a further non-limiting embodiment of any of the foregoing vehicle systems, the swing door includes a storage compartment and at least one latching mechanism.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
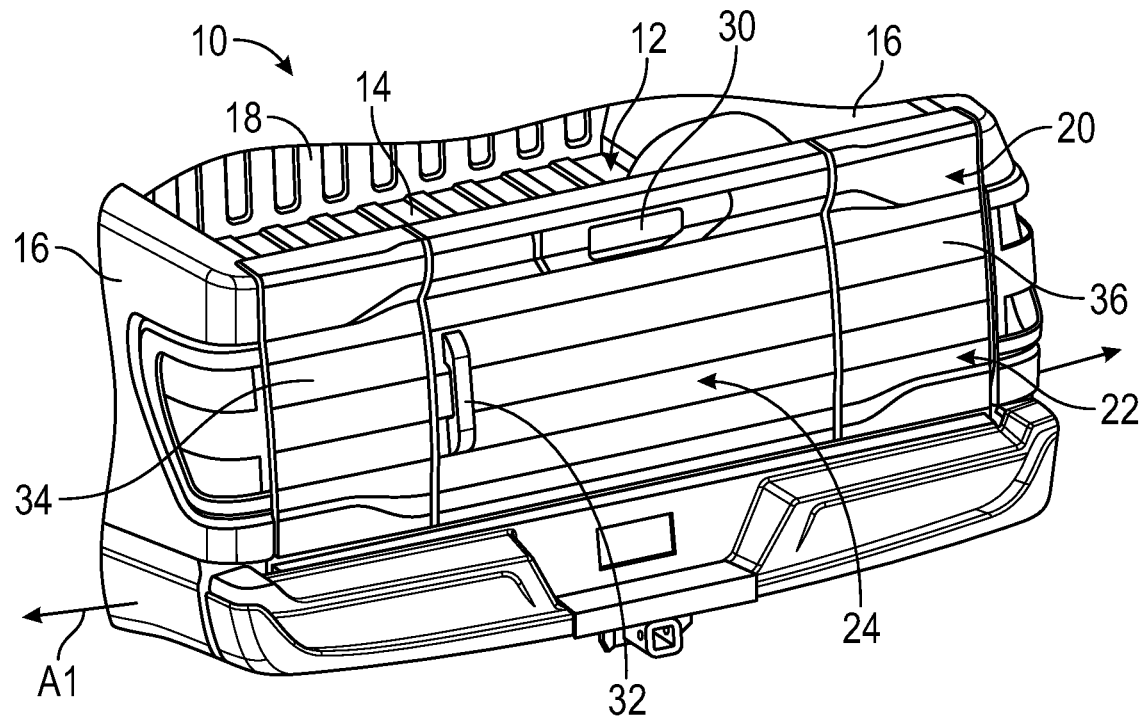
FIG. 1 is a rear perspective view of a motor vehicle equipped with a cargo space and a tailgate assembly positioned in a tailgate closed position relative to the cargo space.

This disclosure details various vehicle systems for facilitating access to and utilization of motor vehicle cargo spaces. The vehicle systems may include deployable stairgate systems, deployable step systems, cargo bed swing door systems, etc. The vehicle systems allow the cargo spaces to be accessed from a variety of positions relative to the cargo space. These and other features of this disclosure are described in greater detail below.

FIGS. 1, 2, 3, and 4 illustrate select portions of a motor vehicle 10 that includes a cargo space for storing and/or hauling one or more items of cargo. In the illustrated embodiment, the vehicle 10 is a pickup truck and the cargo space is established by a cargo bed 12 of the pickup truck. While a pickup truck with a cargo bed is specifically depicted and referenced herein, other vehicles having other types of cargo spaces could also benefit from the teachings of this disclosure. The vehicle 10 could also be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component or system.

The cargo bed 12 is generally rearward of a passenger cabin (not shown) of the vehicle 10 and includes a floor 14 extending between a pair of longitudinally extending side walls 16, a laterally extending front wall 18, and a tailgate assembly 20. The overall size, shape, and configuration of the cargo bed 12 are not intended to limit this disclosure.

The tailgate assembly 20 could be configured as a one-piece tailgate structure or a multi-sectional tailgate structure. The tailgate assembly 20 may include, among other things, a frame subassembly 22 and, optionally, one or more door subassemblies 24. Each door subassembly 24 may sometimes be referred to as a "swing gate subassembly."

Figure 5:
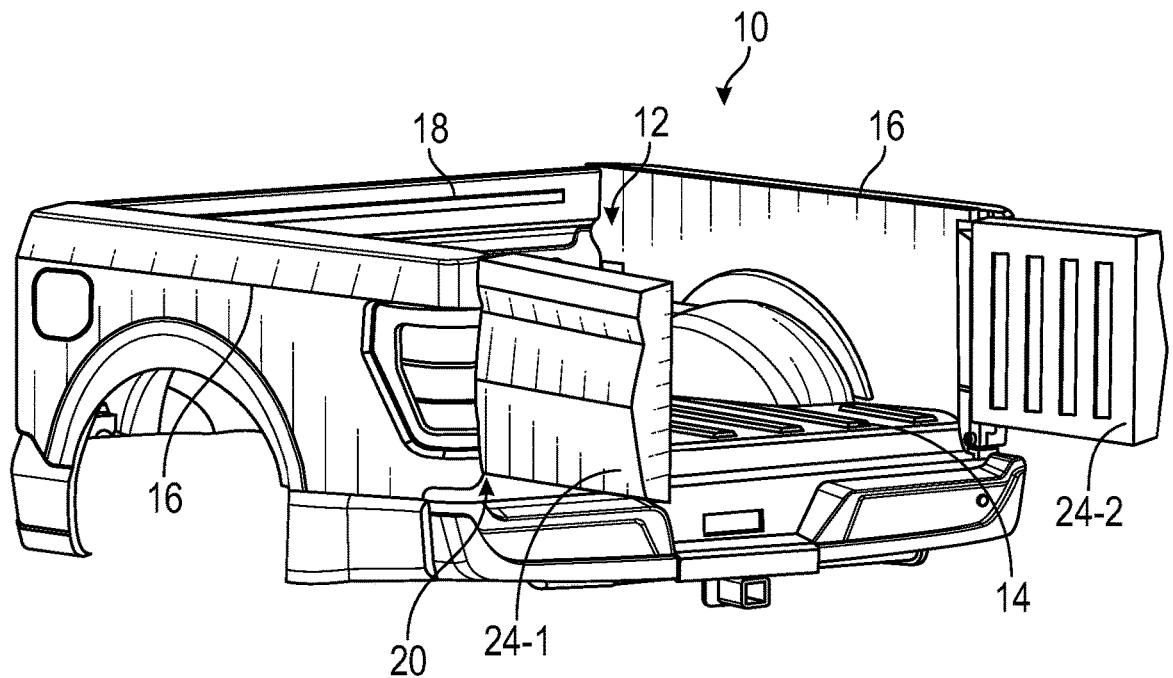
FIG. 5 illustrates a tailgate assembly having multiple door subassemblies.

Although the tailgate assembly 20 of FIGS. 1-4 is shown including a single door subassembly 24, the tailgate assembly 20 could alternatively include a split tailgate design with a first door subassembly 24-1 located on a driver side of the vehicle 10 and a second door subassembly 24-2 located on a passenger side of the vehicle 10 (see, e.g., FIG. 5). Moreover, although embodiments with door subassemblies are shown, the teachings of this disclosure are not limited to tailgate assemblies that include swing gate subassemblies. Rather, the vehicle systems described within this disclosure could be used with vehicles having any type of tailgate structure.

The frame subassembly 22 may include a driver side section 34, a passenger side section 36, and a connection member 38 (see FIG. 3) connected between the driver side section 34 and the passenger side section 36. If provided, the door subassembly 24 may be connected to either the driver side section 34 or the passenger side section 36 by a hinge assembly 35 (see FIG. 3).

Figure 2:
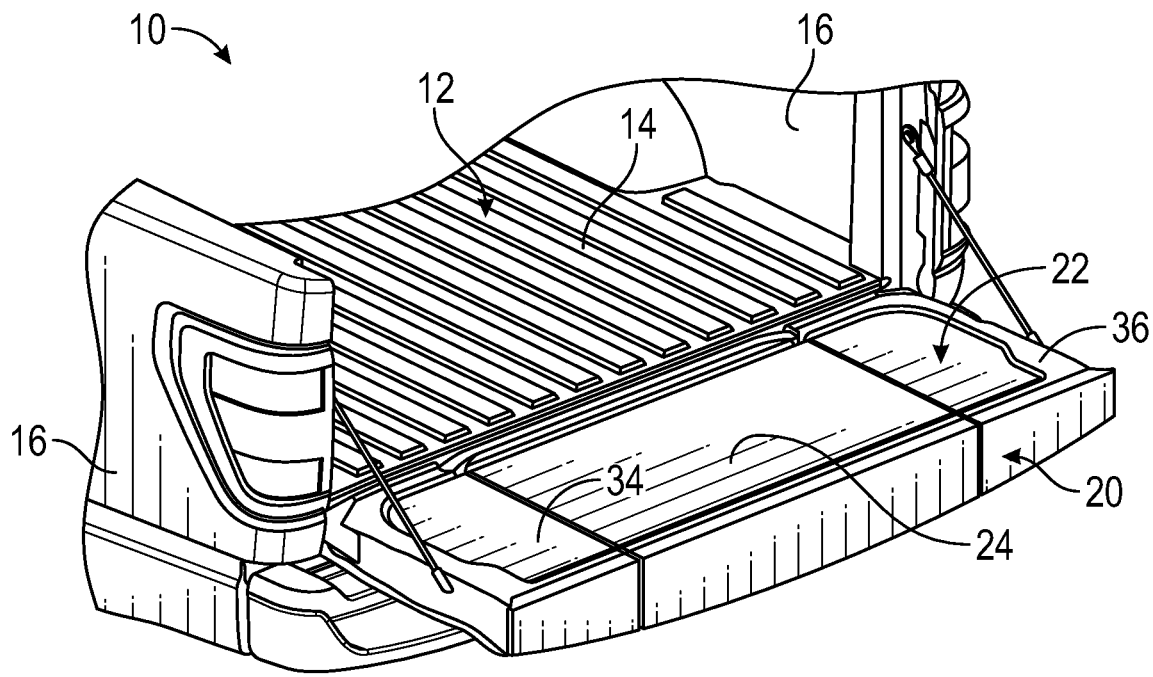
FIG. 2 illustrates the tailgate assembly of FIG. 1 in a tailgate open position.

The tailgate assembly 20 is pivotable about a first axis A1 relative to the cargo bed 12 between a tailgate closed position shown in FIG. 1 and a tailgate open position shown in FIG. 2. The tailgate assembly 20 may be moved from the tailgate closed position to the tailgate open position in response to actuating a first handle 30 of the tailgate assembly 20, for example. The tailgate assembly 20 is vertically aligned when in the tailgate closed position and thus generally encloses an end of the cargo bed 12 that is opposite from the front wall 18, and the tailgate assembly 20 is horizontally aligned when in the tailgate open position and thus generally allows access to the cargo bed 12. Vertical and horizontal, for purposes of this disclosure, are with reference to ground in the ordinary orientation of the vehicle 10 during operation.

If provided, each door subassembly 24 of the tailgate assembly 20 may be in a door closed position and latched to the frame subassembly 22 when the frame subassembly 22 and the door subassembly 24 are pivoted between the tailgate closed position and the tailgate open position. Thus, the frame subassembly 22 and the door subassembly 24 pivot together as a unit when the tailgate assembly 20 is transitioned back and forth between the tailgate closed position and the tailgate open position.

Figure 3:
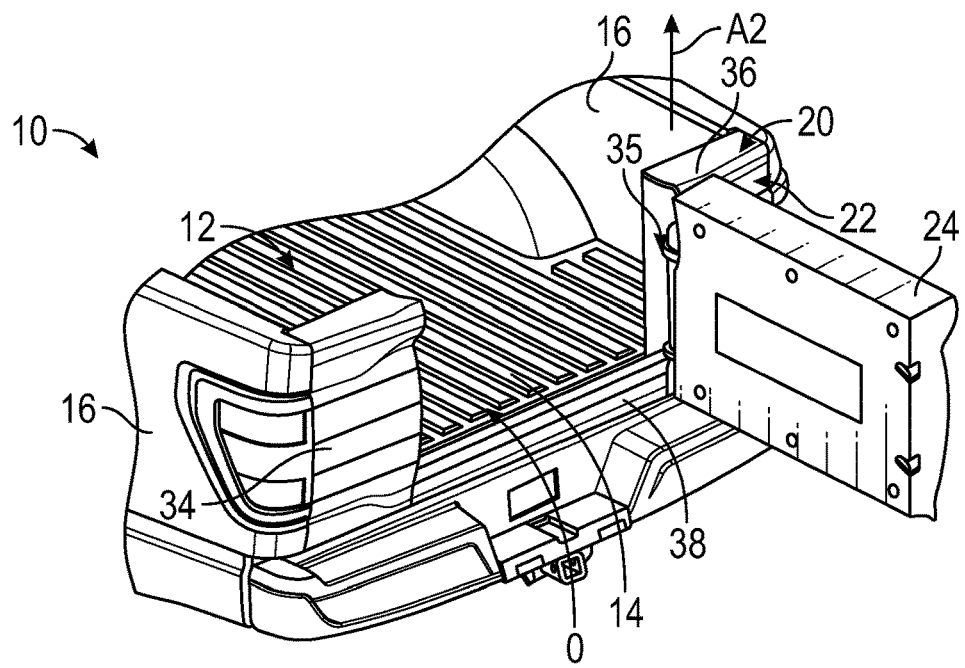
FIG. 3 illustrates a door subassembly of the tailgate assembly of FIG. 1 in a door open position.
Figure 4:
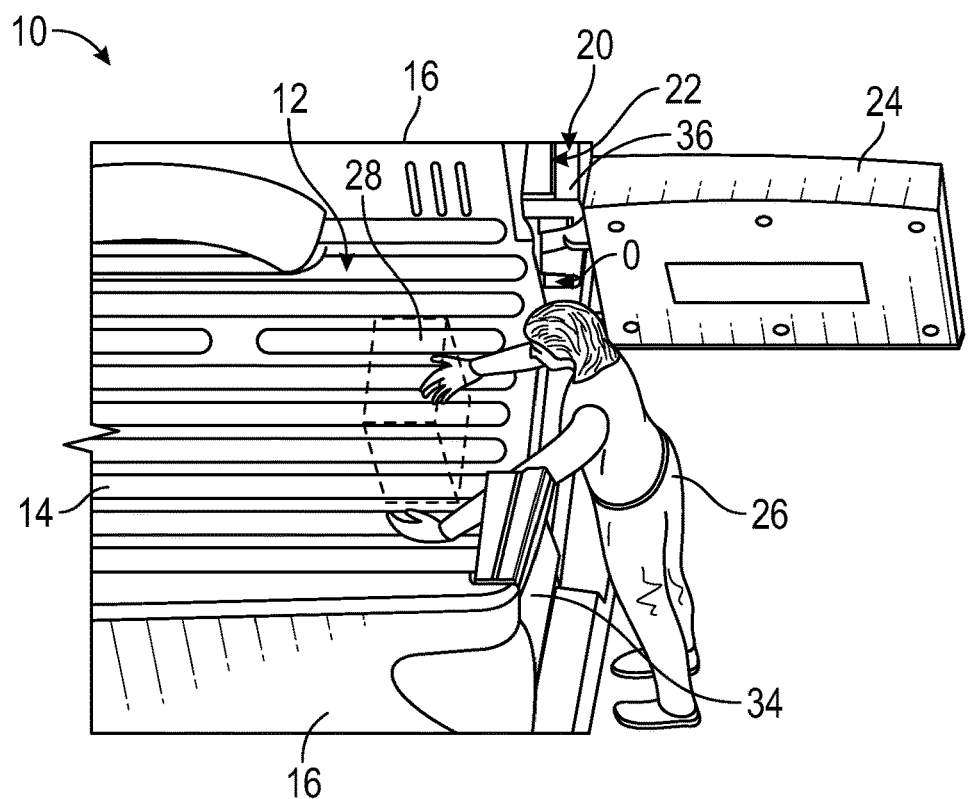
FIG. 4 is a rear and top view of the tailgate assembly and the door subassembly of FIG. 3.

When in the tailgate closed position, the door subassembly 24 may be pivotable relative to the frame subassembly 22 about a second axis A2 between the door closed position shown in FIG. 1 and a door open position shown in FIG. 3. In an embodiment, the first axis A1 is a horizontally extending axis, and the second axis A2 is transverse to the first axis A1 and is thus considered a vertically extending axis. The door subassembly 24 may be moved between the door closed position and the door open position by grasping a second handle 32 (see FIG. 1) of the tailgate assembly 20, for example.

The door subassembly 24 provides a cargo bed access opening O when moved to the door open position. In an embodiment, the cargo bed access opening O extends vertically downward at least as far as the floor 14 of the cargo bed 12. A user 26 (see FIG. 4) can access the cargo bed 12 through the cargo bed access opening O when the door subassembly 24 in positioned in the door open position. Placing the door subassembly 24 in the door open position allows the user 26 to move closer to the cargo bed 12 than, for example, if the tailgate assembly 20 were moved to the tailgate open position of FIG. 2. The cargo bed access opening O can also provide clearance for the user 26 to enter the cargo bed 12 to either load or retrieve an item of cargo 28 (see FIG. 4) without moving the tailgate assembly 20 to the tailgate open position.

The user 26 may periodically require assistance for stepping up and accessing the cargo bed 12 from the ground. This may be particularly true when the vehicle 10 is equipped with relatively large diameter wheels and tires. This disclosure is therefore directed to vehicle systems and methods for better facilitating access to and utilization of the cargo bed 12.

Figure 6:
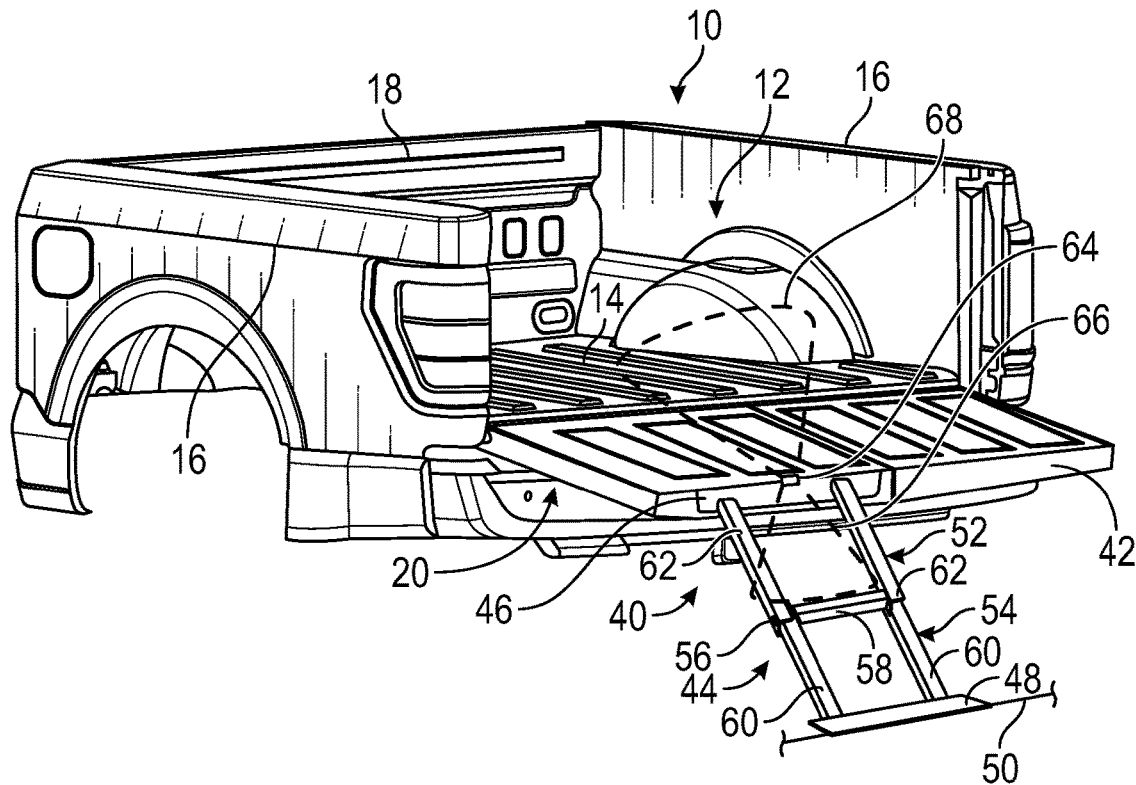
FIG. 6 illustrates a deployable stairgate system for accessing a vehicle cargo space.

FIG. 6 illustrates a deployable stairgate system 40 that can be utilized in connection with a vehicle tailgate assembly, such as the tailgate assembly 20 of the vehicle 10 of FIGS. 1-4, for example. The deployable stairgate system 40 may be configured for assisting users in accessing the cargo bed 12 when the tailgate assembly 20 is moved to the tailgate open position, for example.

In this embodiment, the deployable stairgate system 40 is integrated as part of a tailgate structure 42 of the tailgate assembly 20. The tailgate structure 42 may be a one-piece construction or a multi-sectional construction, such as for providing one or more door subassemblies, for example.

The deployable stairgate system 40 may include a deployable ladder 44 that is movably connected to the tailgate structure 42. The deployable stairgate system 40 is movable between a stowed position in which the deployable ladder 44 is housed within an internal cavity 46 of the tailgate structure 42 and a deployed position in which the deployable ladder 44 is extended outside of the internal cavity 46. In the stowed position, a lower step 48 of the deployable ladder 44 may function as a cover molding section of the tailgate structure 42 that can be positioned in engagement with the remaining portions of the tailgate structure 42 to conceal the deployable ladder 44 inside the internal cavity 46. In the deployed position, the lower step 48 is moved away from the remaining portions of the tailgate structure 42 to position the deployable ladder 44 relative to a ground surface 50 located beneath the tailgate assembly 20 and upon which the vehicle 10 may be parked.

The deployable ladder 44 may include a main stair section 52 and an adjustable stair section 54. The adjustable stair section 54 may be movably connected to the main stair section 52. For example, the adjustable stair section 54 may be lowered relative to the main stair section 52 to ease cargo space ingress/egress on relatively tall vehicles or when the ground surface 50 drops away from the vehicle 10. A detent button 56 may be provided for releasing the adjustable stair section 54 for movement relative to the main stair section 52.

The lower step 48 may establish a base of the adjustable stair section 54. The adjustable stair section 54 may further include one or more additional steps 58. Both the lower step 48 and each additional step 58 may extend between outer frame sections 60 of the adjustable stair section 54. The outer frame sections 58 may slide within channels established by outer frame sections 62 of the main stair section 52.

Figure 7:
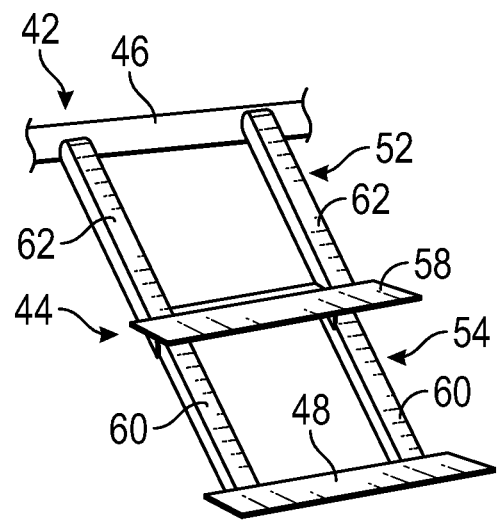
FIG. 7 illustrates a deployable ladder of an exemplary deployable stairgate system.

In an embodiment, the step 58 is a fixed step (see FIG. 6). In another embodiment, the step 58 is a spring-loaded folding step that may fold-out relative to the outer frame sections 60 for providing a relatively wide stepping surface for users (see FIG. 7).

The deployable stairgate system 40 may additionally include one or more split optic lighting modules 64 that are configured to simultaneously emit light in at least two different directions. Each split optic lighting module 64 may be mounted within the internal cavity 46 and may include one or more light sources, such as LEDs, for example.

When the deployable ladder 44 is fully deployed, the split optic lighting module 64 may emit light for simultaneously illuminating portions of both the deployable ladder 44 and the cargo bed 12. For example, the split optic lighting module 64 may emit a first light beam (shown schematically at reference numeral 66) for illuminating portions of the deployable ladder 44, such as the step 58 and the lower step 48, for example, and may emit a second light beam (shown schematically at reference numeral 68) for illuminating portions of the cargo bed 12, such as the floor 14 and/or the side walls 16, for example.

When the deployable ladder 44 is stowed, the split optic lighting module 64 may still emit the second light beam 68 for illuminating portions of the cargo bed 12. However, the first light beam 66 will generally not be visible.

Figure 8:
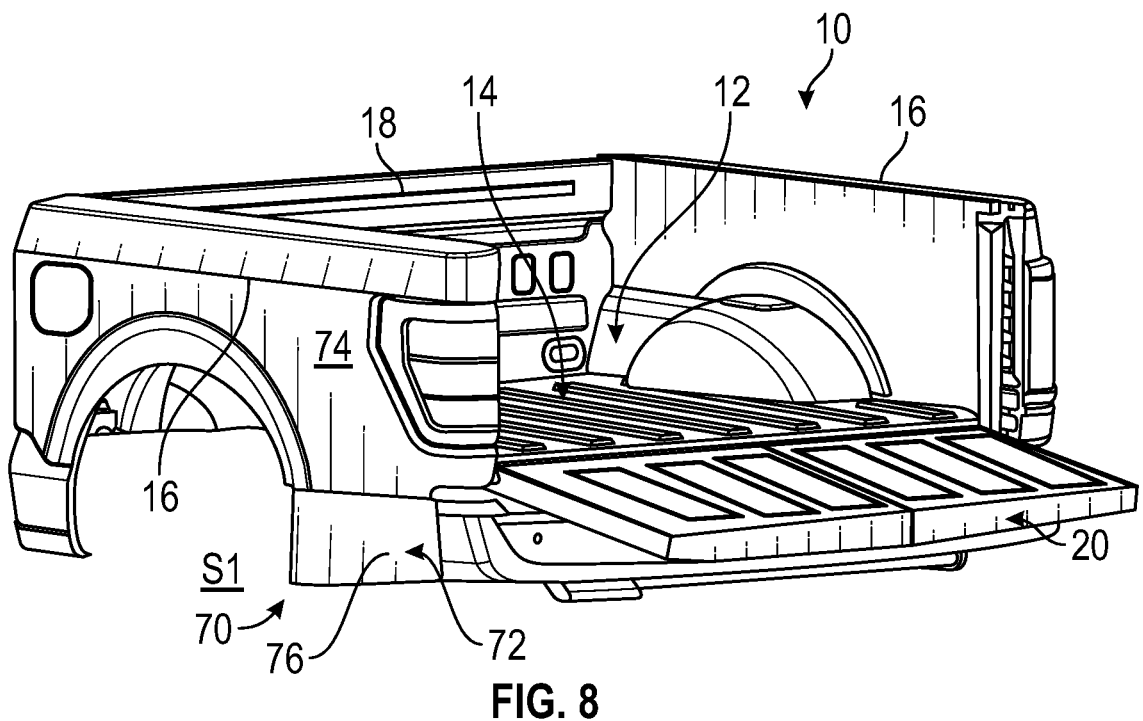
FIG. 8 illustrates a stowed position of a deployable step system.
Figure 9:
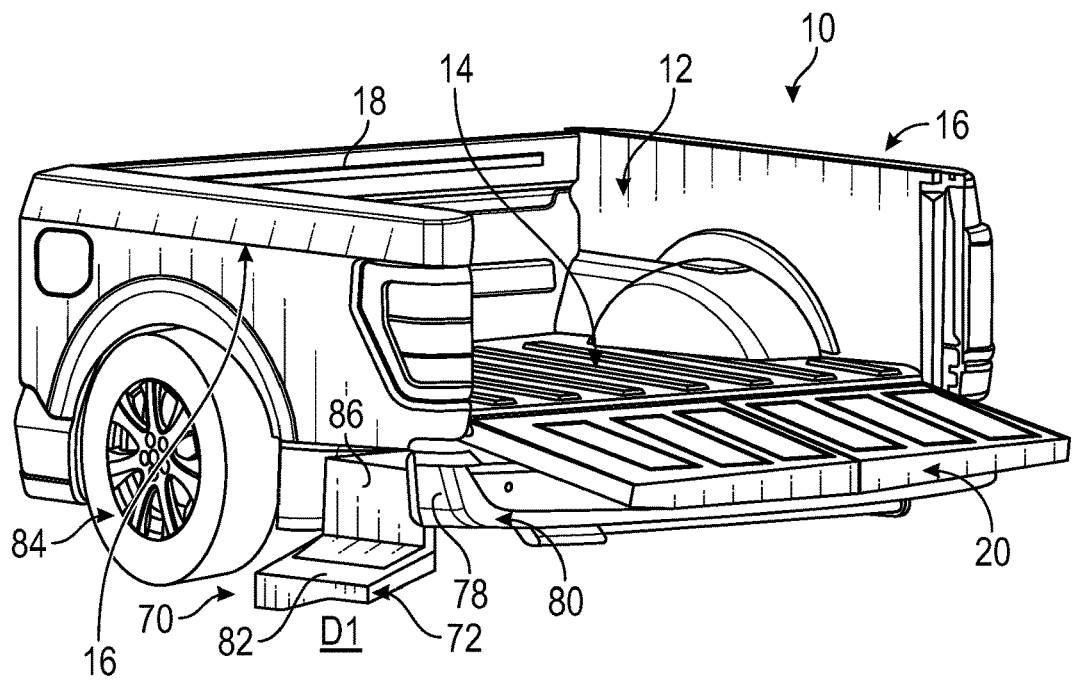
FIG. 9 illustrates a first deployed position of the deployable step system of FIG. 8.
Figure 10:
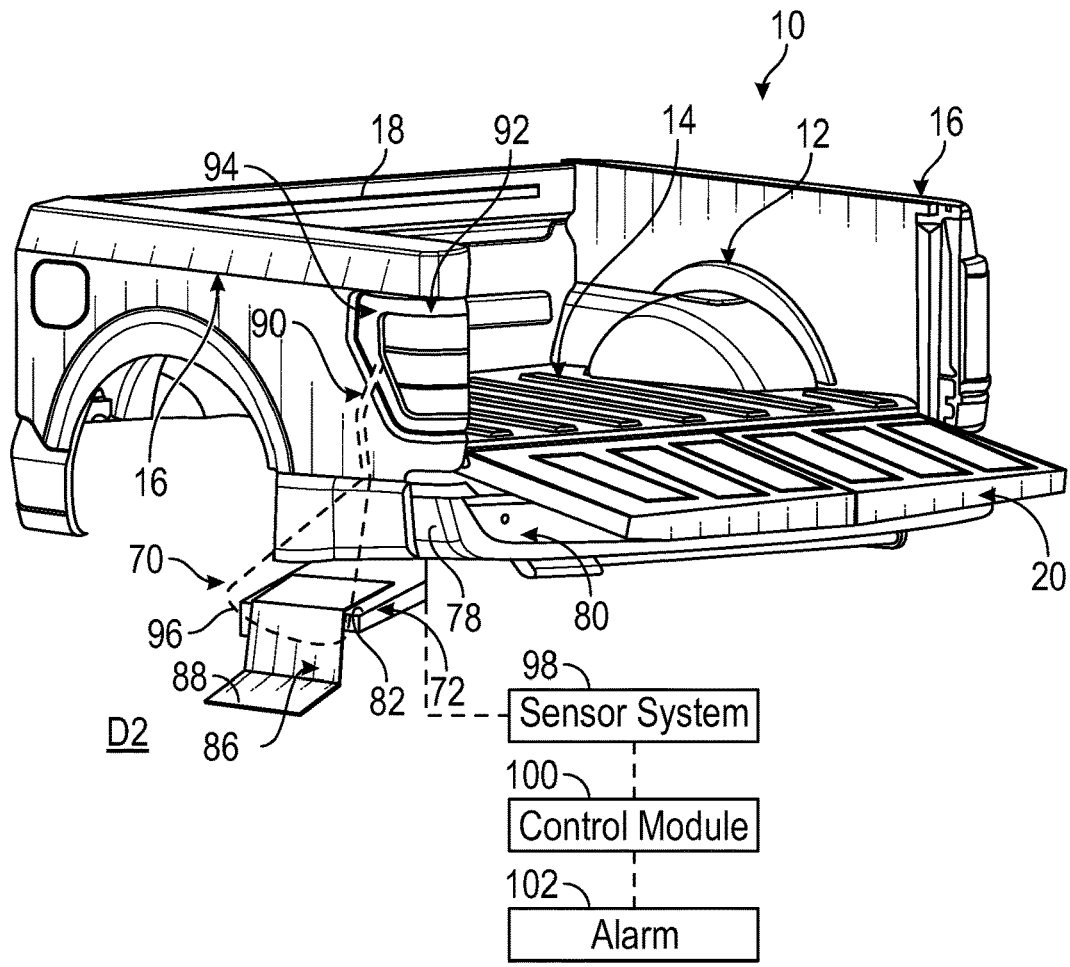
FIG. 10 illustrates a second deployed position of the deployable step system of FIG. 8.

FIGS. 8, 9, and 10 illustrate a deployable step system 70 that can be utilized on a motor vehicle, such as the vehicle 10 of FIGS. 1-5, for example. The deployable step system 70 may be configured for assisting a user when accessing the cargo bed 12 of the vehicle 10, irrespective of whether the tailgate assembly 20 is in the tailgate closed position shown in FIG. 1, the tailgate open position shown in FIG. 2, the door open position shown in FIG. 3, the dual door open position shown in FIG. 5, etc., thereby providing increased utility and functionality.

The deployable step system 70 may provide a fold-out step design that is integrated into at least one of the side walls 16 of the cargo bed 12 of the vehicle 10. In the illustrated embodiment, the deployable step system 70 is mounted to the side wall 16 located on the driver side of the vehicle 10. However, the deployable step system 70 could alternatively or additionally be mounted to the side wall 16 located on the passenger side of the vehicle 10.

The deployable step system 70 may include a drop step 72. In a stowed position S1 of the deployable step system 70, the drop step 72 may be appear as being part of an outer panel 74 of the side wall 16. For example, a bottom surface 76 of the drop step 72 may establish a portion of the outer panel 74 when the deployable step system 70 is in the stowed position S1 of FIG. 8.

The deployable step system 70 is movable between the stowed position S1 shown in FIG. 8 and a first deployed position D1 shown in FIG. 9. In an embodiment, one or more subcomponents (e.g., the drop step 72) of the deployable step system 70 may be manually moved for transitioning between the stowed position S1 and the first deployed position D1. However, in other embodiments, the deployable step system 70 may be automatically moved, such as via a motor and a drive tube, cable, or screw, for example, between the stowed position S1 and the first deployed position D1.

The drop step 72 may be mounted rearward of a rear wheel 84 of the vehicle 10. Therefore, in the first deployed position D1, the drop step 72 may be positioned outboard of an outboard edge 78 of a rear bumper 80 of the vehicle 10. In this position, the drop step 72 may provide a box-side step surface 82 for stepping up and accessing the cargo bed 12 from the side of the vehicle 10. The box-side step surface 82 may be provided on an opposite side of the drop step 72 from the bottom surface 76.

The deployable step system 70 may further include a deployable step 86 that is movable relative to the drop step 72. From the first deployed position D1, the deployable step system 70 may be further moved to a second deployed position D2 (see FIG. 10) by rotating the deployable step 86 relative to the drop step 72. The deployable step 86 may provide a second box-side step surface 88 that is positioned at a lower height than the box-side step surface 82 when the deployable step system 70 is moved to the second deployed position D2. In an embodiment, both the deployed box-side step surface 82 and the deployed second box-side step surface 88 are positioned at a lower height than a height of the bumper 80.

The deployable step system 70 may further include a light pipe 90 arranged for illuminating portions of the drop step 72 and/or the deployable step 86 when the steps are deployed. The light pipe 90 may be connected to a tail lamp assembly 92 of the vehicle 10 and may be routed through an internal cavity of the side wall 16 of the cargo bed 12. In an embodiment, the light pipe 90 is connected to a side marker portion 94 of the tail lamp assembly 92 and is arranged to pipe a light beam 96 from the side marker portion 94 onto the drop step 72 and/or the deployable step 86. However, other implementations could be possible within the scope of this disclosure.

The deployable step system 70 may further include a sensor system 98 and a control module 100 that are operably connected to one another. The sensor system 98 may include one or more sensors (e.g., a door ajar sensor, etc.) arranged and configured to monitor a position of the deployable step system 70. For example, the sensor system 98 may monitor whether the deployable step system 70 is in the first deployed position D1 or the second deployed position D2. If so, and if the vehicle 10 is then placed in a drive gear, the control module 100 may command an alarm 102. The alarm 102 may take the form of an audible alert, such as an alert produced by a sound exciter mounted on the vehicle 10, a message displayed on a human machine interface of the vehicle 10, a message displayed on a personal electronic device (e.g., a smart phone) of the operator of the vehicle 10, etc. The alarm 102 may remind the user to return the deployable step system 70 to the stowed position S1.

Although schematically illustrated as a single controller, the control module 100 may be part of a vehicle control system that includes a plurality of additional control modules for interfacing with and commanding operation of the various components of the vehicle 10. In an embodiment, the control module 100 is part of a body control module (BCM) of the vehicle 10. However, other configurations are also contemplated within the scope of this disclosure.

Figure 11:
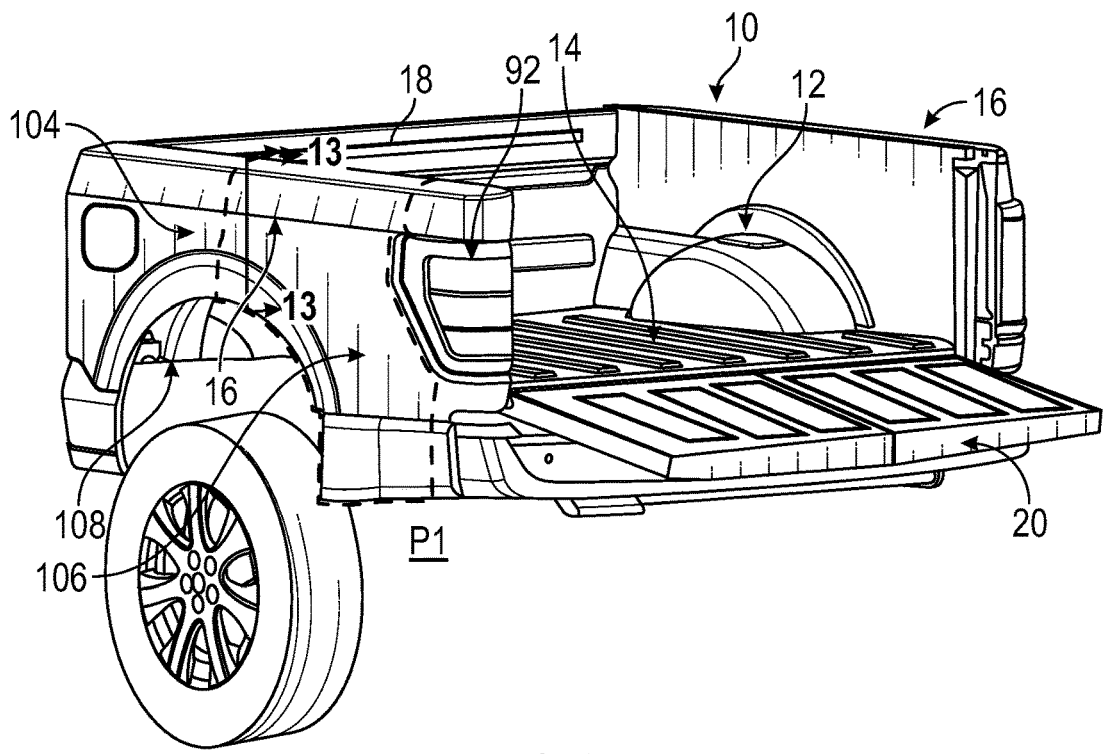
FIG. 11 illustrates a door closed position of a cargo bed swing door system.
Figure 12:
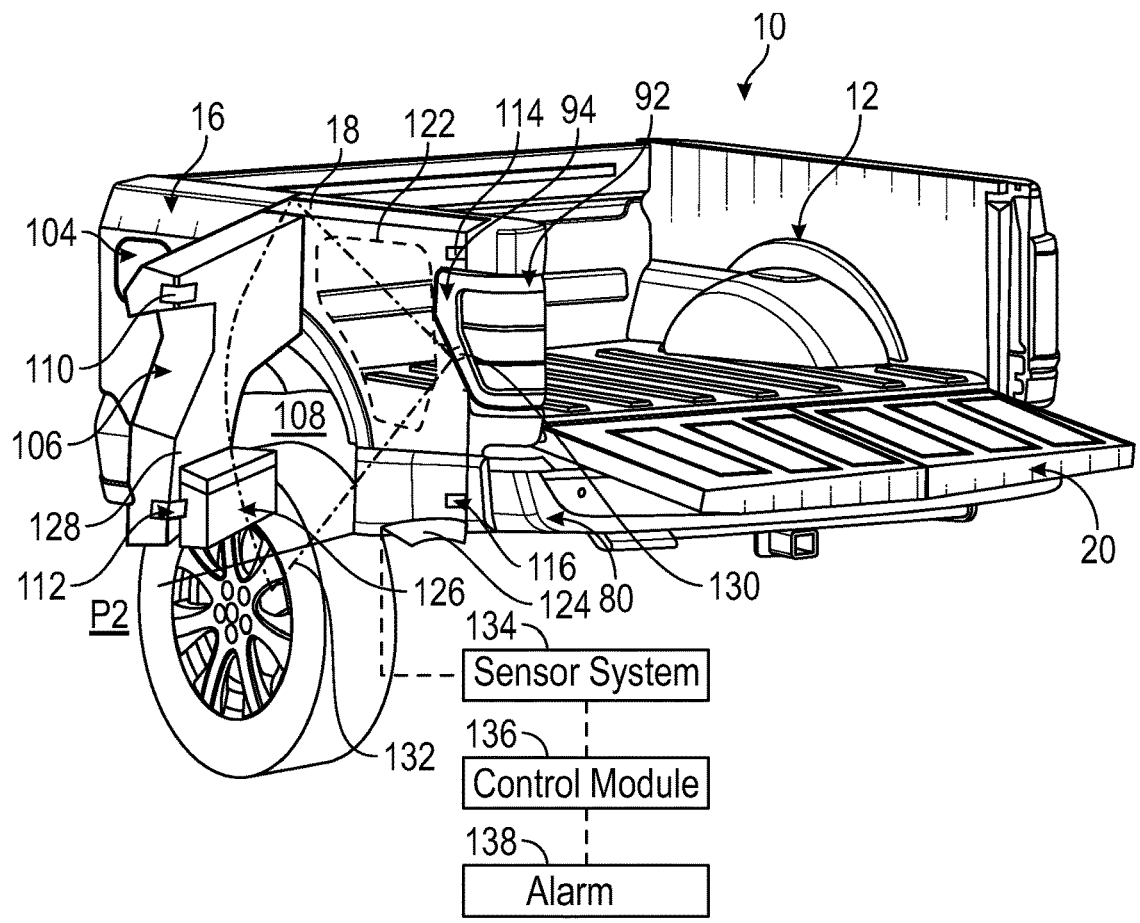
FIG. 12 illustrates a door open position of the cargo bed swing door system of FIG. 11.
Figure 13:
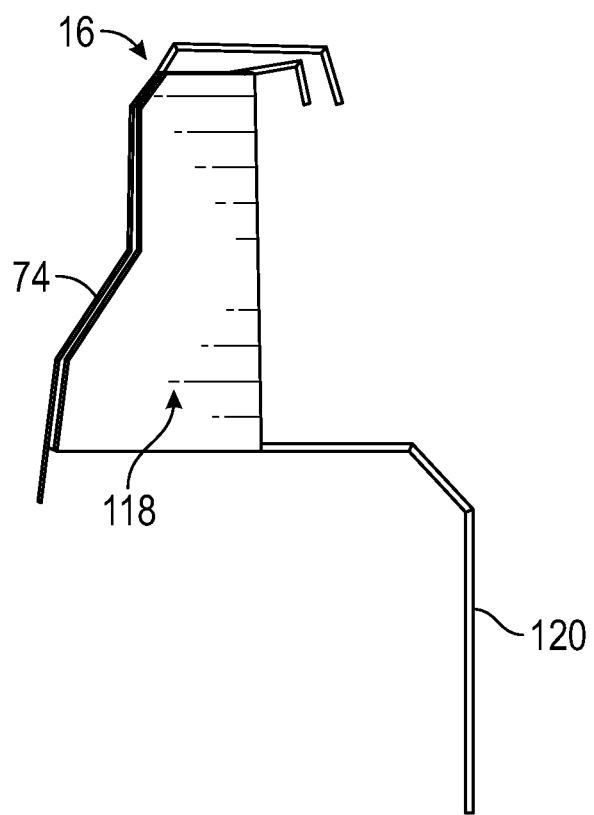
FIG. 13 is a cross-sectional view through section 13-13 of the cargo bed swing door system of FIG. 11.

FIGS. 11, 12, and 13 illustrate a cargo bed swing door system 104 that can be utilized on a motor vehicle, such as the vehicle 10 of FIGS. 1-5, for example. The cargo bed swing door system 104 may be configured for assisting a user when accessing the cargo bed 12 of the vehicle 10 without the need to open, close, or otherwise reposition the tailgate assembly 20, thereby providing increased utility and functionality.

The cargo bed swing door system 104 may provide a swing-out door design that is integrated into at least one of the side walls 16 of cargo bed 12 of the vehicle 10. In the illustrated embodiment, the cargo bed swing door system 104 is part of the side wall 16 located on the driver side of the vehicle 10. However, the cargo bed swing door system 104 could alternatively or additionally be mounted to the side wall 16 located on the passenger side of the vehicle 10.

The cargo bed swing door system 104 may include a swing door 106 that is pivotably mounted to the side wall 16. The swing door 106 may be moved between a closed position P1 (see FIG. 11) and an open position P2 (see FIG. 12). The swing door 106 may be either manually moved or automatically moved between the closed and open positions P1, P2.

In an embodiment, the swing door 106 extends between a rear wheel well 108 and the tail lamp assembly 92 of the vehicle 10 when in the closed position P1. However, the swing door 106 could be located anywhere within the side wall 16.

In the closed position P1, the swing door 106 may be latched to the side wall 16. For example, the swing door 106 may include an upper latching mechanism 110 and a lower latching mechanism 112 that are configured to engage an upper striker pin 114 and a lower striker pin 116, respectively, that are mounted to the side wall 16. In an embodiment, the upper striker pin 114 is mounted above the tail lamp assembly 92, and the lower striper pin 116 is mounted below the tail lamp assembly 92.

The swing door 106 may be pivoted about an axis A (best shown in FIG. 12) between the closed position P1 and the open position P2. The axis A is a vertically extending axis in the illustrated embodiment.

The cargo bed swing door system 104 may include a hinge pillar 118 (see FIGS. 12 and 13) that is configured to structurally support the swing door 106 and enable pivotability of the swing door 106 between the closed position P1 and the open position P2. The hinge pillar 118 may be mounted (e.g., welded) to both an outer panel 74 and an inner panel 120 of the side wall 16 of the cargo bed 12 (see, e.g., FIG. 13). In an embodiment, the hinge pillar 118 is positioned above the rear wheel well 108 of the vehicle 10. In another embodiment, the hinge pillar 118 is located near an apex of the rear wheel well 108.

When moved to the open position P2, the swing door 106 may provide a cargo bed side access opening 122 (see FIG. 12). In an embodiment, the cargo bed side access opening 122 is a complete opening formed through the side wall 16. In another embodiment, the cargo bed side access opening 122 is a pass-through opening formed through the inner panel 120 of the side wall 16 and that is exposed when the swing door 106 is moved to the open position P2. In either event, a user can access the cargo bed 12 through the cargo bed side access opening 122, such as for either loading or retrieving an item of cargo, without moving the tailgate assembly 20 to the tailgate open position.

A step 124 of the cargo bed swing door system 104 may be exposed when the swing door 106 is moved to the open position P2 of FIG. 12. In an embodiment, the step 124 is built into a bottom portion of the side wall 16 of the cargo bed 12. The step 124 may be positioned between the rear wheel well 108 and the bumper 80.

A storage compartment 126 may be mounted to or otherwise integrated into an interior facing surface 128 of the swing door 106. The storage compartment 126 may be configured for storing items and may also be lockable.

The cargo bed swing door system 104 may further include a light pipe 130 arranged for illuminating portions of the swing door 106 and/or the cargo bed side access opening 122 when the swing door 106 is open. The light pipe 130 may be connected to the tail lamp assembly 92 of the vehicle 10 and may be routed through an internal cavity of the side wall 16 of the cargo bed 12. In an embodiment, the light pipe 130 is connected to a side marker portion 94 of the tail lamp assembly 92 and is arranged to pipe a light beam 132 from the side marker portion 94 onto the swing door 106 and/or the cargo bed side access opening 122. However, other implementations may also be possible and are therefore contemplated within the scope of this disclosure.

The cargo bed swing door system 104 may further include a sensor system 134 and a control module 136 that are operably connected to one another. The sensor system 134 may include one or more sensors (e.g., blind spot detection sensors, etc.) arranged and configured to monitor a position of the swing door 106 of the cargo bed swing door system 104. For example, the sensor system 134 may monitor whether the swing door 106 is in the open position P2. If so, the control module 100 may either prevent the vehicle 10 from being shifted to a drive gear and/or may command an alarm 138. The alarm 138 may take the form of an audible alert, a message displayed on a human machine interface of the vehicle 10, a message displayed on a personal electronic device of the operator of the vehicle 10, etc.

Although schematically illustrated as a single controller, the control module 136 may be part of a vehicle control system that includes a plurality of additional control modules for interfacing with and commanding operation of the various components of the vehicle 10. In an embodiment, the control module 136 is part of a body control module (BCM) of the vehicle 10. However, other configurations are also contemplated.

The systems of this disclosure provide solutions for improving access to and utilization of vehicle cargo spaces. The proposed systems may include deployable stairgates, deployable step systems, and/or cargo bed swing door systems for facilitating access to vehicle cargo spaces. The proposed systems provide less complex and more effective solutions for accessing and utilizing the cargo spaces from various positions of the cargo space.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
a cargo bed including a first side wall, a second side wall, a floor, a front wall, and a tailgate structure; and
a deployable step system mounted to at least one of the first side wall or the second side wall at a location between a rear wheel and a rear bumper of the vehicle, wherein the deployable step system is movable between a stowed position and a first deployed position,
wherein, in the stowed position, a drop step of the deployable step system establishes a portion of the first side wall or the second side wall,
wherein, in the first deployed position, the drop step provides a first box-side step surface for accessing the cargo bed.

2. The vehicle as recited in claim 1, wherein the deployable step system includes a deployable step that is rotatably connected to the drop step.

3. The vehicle as recited in claim 2, wherein, in a second deployed position of the deployable step system, the deployable step provides a second box-side step surface for accessing the cargo bed.

4. The vehicle as recited in claim 3, wherein the second box-side step surface is positioned at a lower height than the first box-side step surface compared to a ground surface.

5. The vehicle as recited in claim 1, wherein the deployable step system includes a light pipe arranged for illuminating portions of the drop step.

6. The vehicle as recited in claim 5, wherein the light pipe is connected to a tail lamp assembly.

7. The vehicle as recited in claim 1, comprising a sensor system and a control module operably connected to the sensor system, wherein the control module is programmed to command an alarm when the sensor system detects that the deployable step system is in the first deployed position and when the vehicle is moved to a drive gear.

8. The vehicle as recited in claim 1, wherein a bottom surface of the drop step establishes part of an outer panel of the first side wall or the second side wall when the deployable step system is in the stowed position.

9. The vehicle as recited in claim 1, wherein, in the first deployed position, the drop step is positioned outboard of an outboard edge of the rear bumper.

10. The vehicle as recited in claim 1, wherein the drop step of the deployable step system is located completely outside of the cargo bed in both the stowed position and the first deployed position.

11. The vehicle as recited in claim 1, wherein, in the first deployed position, the first box-side step surface is positioned at a lower height than the rear bumper.

12. The vehicle as recited in claim 5, wherein the light pipe is routed through an internal cavity of the first side wall or the second side wall.

13. The vehicle as recited in claim 5, wherein the light pipe is connected to a side marker portion of a tail lamp assembly.

14. The vehicle as recited in claim 13, wherein the light pipe is configured to pipe a light beam from the side marker portion onto the drop step.

15. The vehicle as recited in claim 14, wherein the light pipe is configured to pipe a light beam from the side marker portion onto both the drop step and a deployable step that is rotatably connected to the drop step.

16. The vehicle as recited in claim 1, wherein the tailgate structure includes a frame subassembly and a first swing gate subassembly that is pivotable relative to the frame subassembly.

17. The vehicle as recited in claim 16, wherein the tailgate structure includes a second swing gate subassembly that is pivotable relative to the frame subassembly.

18. A vehicle, comprising:
a cargo bed including a first side wall, a second side wall, a floor, a front wall, and a tailgate structure; and
a deployable step system mounted to the first side wall and configured to move between a stowed position and a first deployed position, wherein, in the stowed position, a bottom surface of a drop step of the deployable step system establishes part of an outer panel of the first side wall, wherein, in the first deployed position, the drop step provides a box-side step surface for accessing the cargo bed, wherein the drop step of the deployable step system is located completely outside of the cargo bed in both the stowed position and the first deployed position.

19. A vehicle, comprising:

a cargo bed including a first side wall, a second side wall, a floor, a front wall, and a tailgate structure; and a deployable step system mounted to the first side wall and including a drop step and a light pipe arranged for illuminating at least a portion of the drop step, wherein, in a stowed position of the deployable step system, the drop step provides part of an outer panel of the first side wall, wherein, in a first deployed position of the deployable step system, the drop step provides a box-side step surface for accessing the cargo bed, wherein the light pipe is connected to a side marker portion of a tail lamp assembly of the vehicle and is configured to pipe a light beam from the side marker portion onto the drop step.

\* \* \* \* \*